(12) United States Patent  (10) Patent No.: US 6,862,873 B2
Franet  (45) Date of Patent: Mar. 8, 2005

(54) WINDROW MERGING ATTACHMENT

(75) Inventor: Roger Franet, Sarraguemines (FR)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/209,373

(22) Filed: Jul. 31, 2002

(65) Prior Publication Data

US 2003/0024228 A1 Feb. 6, 2003

(30) Foreign Application Priority Data

Aug. 4, 2001 (DE) .......................................... 101 38 445

(51) Int. Cl.⁷ ............................................... A01D 57/30
(52) U.S. Cl. ....................................................... 56/192
(58) Field of Search .......................... 56/192, 378, 384, 56/395–398, DIG. 21, DIG. 10, 370, 344–345, 354–355, 358, 365–366, 375–376, 14.9, 341

(56) References Cited

U.S. PATENT DOCUMENTS

| | | | | |
|---|---|---|---|---|
| 2,484,981 | A | * 10/1949 | Coultas | ....................... 56/192 |
| 2,761,270 | A | * 9/1956 | Blaser et al. | .................. 56/370 |
| 3,141,284 | A | * 7/1964 | Reynolds | ..................... 56/354 |
| 3,221,484 | A | * 12/1965 | van der Lely | ................. 56/370 |
| 3,717,981 | A | * 2/1973 | van der Lely | ................... 56/6 |
| 4,037,390 | A | * 7/1977 | Vogelenzang | ............... 56/14.5 |
| 4,392,339 | A | * 7/1983 | Berlivet et al. | ............... 56/192 |
| 4,573,309 | A | * 3/1986 | Patterson | ..................... 56/228 |
| 4,738,092 | A | * 4/1988 | Jennings | ....................... 56/372 |
| 5,031,393 | A | * 7/1991 | Rostoucher | ................... 56/154 |
| 5,155,986 | A | * 10/1992 | Kelderman | ................... 56/365 |
| 5,177,944 | A | * 1/1993 | Finlay | .......................... 56/365 |
| 5,203,154 | A | * 4/1993 | Lesher et al. | .................. 56/366 |
| 5,301,496 | A | * 4/1994 | Sudbrack et al. | ............. 56/366 |
| 6,145,289 | A | * 11/2000 | Welsch et al. | ................. 56/192 |
| 6,205,757 | B1 | * 3/2001 | Dow et al. | ..................... 56/366 |
| 6,212,865 | B1 | * 4/2001 | Peeters et al. | ................. 56/366 |
| 6,354,429 | B2 | * 3/2002 | Kuhlmann et al. | ....... 198/510.1 |
| 6,401,440 | B1 | * 6/2002 | Franet et al. | ................. 56/16.6 |

FOREIGN PATENT DOCUMENTS

| | | |
|---|---|---|
| DE | C 199 31 684 | 9/2000 |
| GB | A-2 215 971 | 10/1989 |

* cited by examiner

Primary Examiner—Robert E. Pezzuto
Assistant Examiner—Alicia Torres

(57) ABSTRACT

A windrow merging implement with a pick-up, a conveyor and a connecting hitch or structure is provided in combination with a mowing vehicle, with the connecting hitch being releasably secured to a rear end of the vehicle chassis. The mowing vehicle is operative to form windrows of crop in one or more of three locations, namely, a central location passing longitudinally between the wheels of the vehicle and one on each side of the vehicle. The windrow merging implement may be positioned at either side of the vehicle for picking up the windrow deposited there, and includes a conveyor structure for either depositing the picked up windrow upon or alongside the centrally deposited windrow. Also disclosed is an embodiment where the windrow merging implement picks up and displaces transversely the centrally deposited windrow. A further embodiment discloses two windrow merging implements which respectively pick up the windrows at the opposite sides of the vehicle and convey them inwardly so as to be combined with the centrally located windrow.

9 Claims, 3 Drawing Sheets

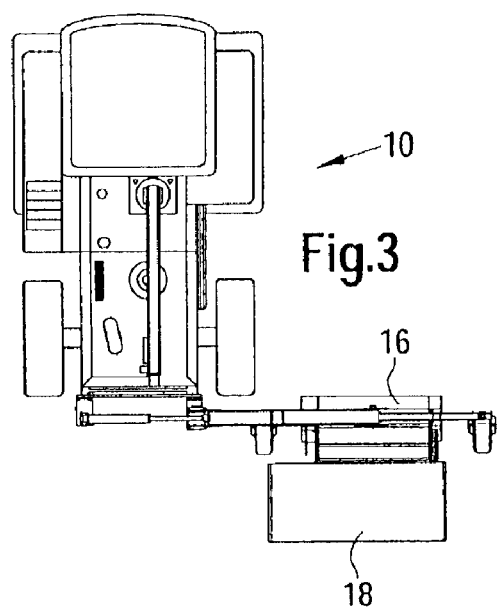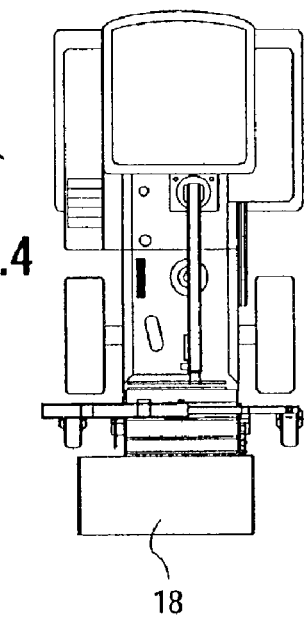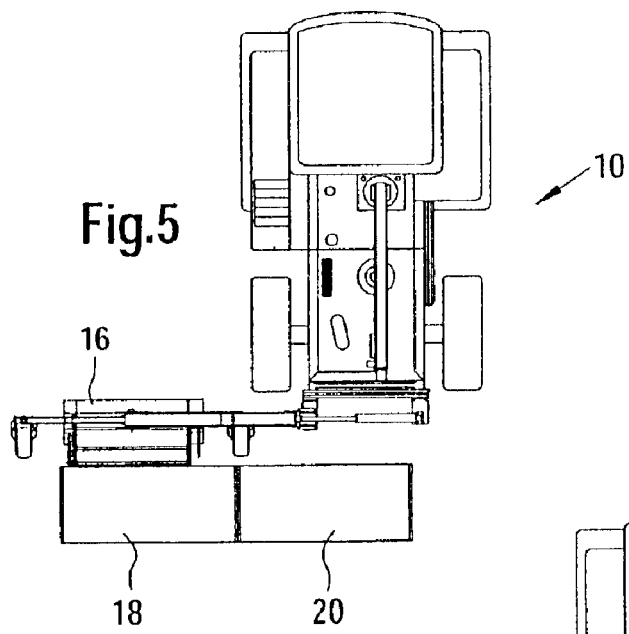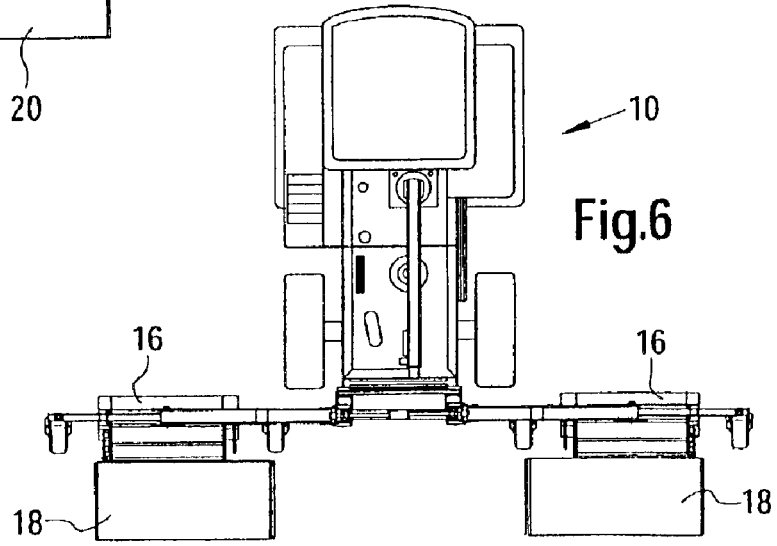

WINDROW MERGING ATTACHMENT

FIELD OF THE INVENTION

The invention concerns a crop swath or windrow merging attachment including a pick-up, a conveyor and a mounting structure for connecting the attachment to a vehicle, as well as a vehicle and a windrow merging process.

BACKGROUND OF THE INVENTION

GB-A-2 215 971 reveals a windrow merging attachment including a pick-up and conveying arrangement for windrowed crop lying on the ground, that is fastened to the front side of an agricultural tractor and repositions crop lying on the ground in front of the agricultural tractor to the side of the latter.

The problem underlying the invention is seen in the fact that too many operating steps are required for the mowing of the crop and its gathering into swaths or windrows.

DE-C 199 31 684 discloses a self-propelled mowing vehicle with one mowing unit located in front, one located at the left and one located at the right of the running gear. The front mowing unit deposits the crop that has been cut centrally in a swath or windrow between the wheels of the mowing vehicle, while the mowing units at the side convey the crop to the center of the vehicle and throw it between the front and the rear wheels upon the swath already formed between the wheels.

This embodiment accommodates only a small amount of crop since the space for a swath between the wheels is relatively small. Beyond that, the crop in the edge region of the swath can be damaged by wheels rolling over it.

The result of these considerations is the problem of the low harvesting capacity.

Finally it is known practice to combine crop lying on the ground by means of a tedder which, however, has the disadvantage that the tedder can lose tines or whirl up stones which then can reach the crop as foreign objects.

SUMMARY OF THE INVENTION

According to the present invention, there is provided an improved windrow merging or grouping implement adapted for connection to a mowing and windrowing implement.

An object of the invention is to provide a windrow merging or grouping implement which is of a relatively simple, compact structure.

A more specific object of the invention is to provide a windrow merging or grouping implement wherein the connecting structure is fixed to and in transverse alignment with the pick-up which delivers crop rearwardly to a conveyor for conveying the crop to the side. The windrow merging or grouping implement is particularly suited for being fastened to the rear of a vehicle having one or more mowing units coupled to locations ahead of the windrow merging implement. For example, the vehicle may be a self-propelled traction unit carrying up to three mowing units, with one being in front and the other two being at opposite sides of the vehicle. In any event, the only thing that is essential is that the windrow merging implement be located downstream of the mowing arrangement on the vehicle and thereby can take up the crop previously deposited and convey it to the side. Although this merging implement was originally conceived preferably for a mowing vehicle, other areas of application are also conceivable. For example, the foliage of beets, potatoes or the like can be taken up after separate cropping and conveyed to the side.

The connecting structure that extends from the pick-up can be repositioned, if necessary, together with a conveyor, and makes it possible to pivot the pick-up to the limits allowed for transport on public roads or even to bring it to another location for the operation. For example, the pick-up can be employed to the left or the right side of the vehicle.

The rigid connection between the conveyor and the pick-up provides assurance that the crop taken up by the pick-up is conducted over to the conveyor without clinging to it.

By means of a further conveyor, the crop taken up by the first conveyor and the second conveyor can be transported over a wide distance and thereby, if necessary, be transported from one side of the vehicle to the other side.

The ability to reposition the further conveyor makes it possible to utilize the possibility of a wide transport or to refrain from doing so. For example, the further conveyor can be brought into a position in which the crop is deposited behind the vehicle instead of to its side.

Support wheels are provided on the one hand to assure the desired distance of the pick-up from the ground and on the other hand to reduce the load on the support components of the windrow merging implement.

The configurations of the conveyor or conveyors as conveyor belt, screw conveyor, bar chain conveyor or rolls extending parallel to each other represent examples of solutions for a gentle and effective transport.

Forage harvesters or other carrier vehicles for application to agriculture with mowing arrangements on the front side represent effective machines for the mowing of grass or other crops where the crop is deposited on the ground in windrows or swaths and can be deposited close together by means of the windrow merging implement so that it can be taken up by a following chopper vehicle and processed further. Forage harvesters are specialized carrier vehicles that are optimally appropriate on the basis of their configuration to be provided with corresponding equipment on their front and rear ends.

The provision of a discharge opening of the mowing arrangement on the side of the vehicle relative to its longitudinal axis makes it possible to deposit a part of the crop taken up by the mowing arrangement to the side of the vehicle instead of between its wheels, so that problems with a high swath between the wheels do not develop.

The use of a three-point hitch permits a rapid installation and removal of the windrow merging implement on the vehicle.

A hydraulic drive can be supplied by means of flexible hoses so that the pick-up and/or the conveyor or conveyors are not limited during their movement by any possible rigid drive connections. Furthermore a hydraulic drive permits the speed and/or the direction of the conveyor to be changed very easily, so that the location of the deposit can be selected precisely.

If two pick-up windrow merging implements and conveyors are used, then crop that has been deposited on both sides of the vehicle in one swath can be combined into a wide swath located centrally behind the vehicle.

By means of the processes described, a highly effective harvest and grouping of the harvested crop is possible, since the crop is separated from the stalk and deposited in swaths with a single vehicle and in a single operation, the swaths are located so close to each other that they can be taken up by a narrow vehicle such as a forage harvester, a baler, a self-loading forage box or the like.

BRIEF DESCRIPTION OF THE DRAWINGS

The drawing shows an embodiment of the invention that shall be described in greater detail in the following.

FIG. 3 shows a plan view of a second embodiment of the vehicle with the windrow merging implement.

FIG. 4 shows a plan view of a third embodiment of the vehicle with the windrow merging implement.

FIG. 5 shows a plan view of a fourth embodiment of the vehicle with the windrow merging implement.

FIG. 6 shows a plan view of a fifth embodiment of the vehicle with the windrow merging implement.

DESCRIPTION OF THE PREFERRED EMBODIMENT

Figure 1:
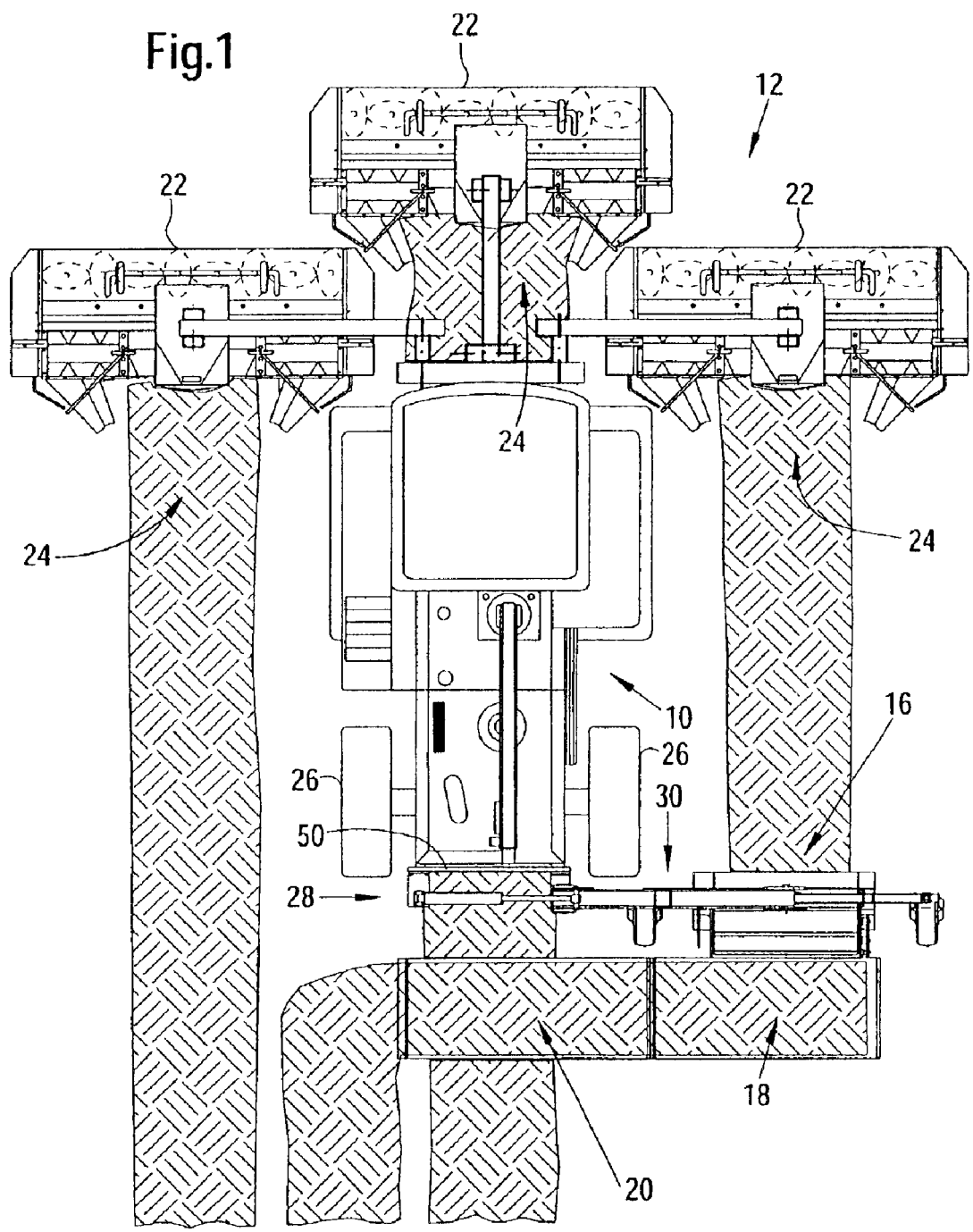
FIG. 1 shows a schematic plan view of a vehicle with a mowing arrangement and a windrow merging implement with a pick-up and two conveyors.

FIG. 1 shows a vehicle 10 with a mowing arrangement 12 and a windrow merging implement 14 with a pick-up 16 and a first conveyor 18 and a further conveyor 20.

The vehicle 10 that is shown schematically in the plan view is, in the simplest case, a self-propelled forage harvester; nevertheless it could also be a different type of self-propelled utility vehicle, for example, a combine or an implement carrier.

In this embodiment, the mowing arrangement 12 includes three mowing units 22, in particular, a central, a left and a right mowing unit, where the left and the right units are located generally at the side of the vehicle 10, Each mowing unit 22 includes a discharge opening 24 located such that the front mowing unit deposits a swath or windrow of crop centered along the longitudinal centerline of the vehicle, while the left and right mowing units respectively deposit swaths to the opposite sides of the vehicle. Each mowing unit 22 is preferably equipped with a processing unit not shown, for example, a rotary tine conditioner or a pair of cooperating conditioner rolls, and deposits the crop through each of the discharge openings 24 in a swath on the ground. With a vehicle 10 according to FIG. 1, three swaths are produced that extend parallel to each other, where the central swath is deposited on the ground between the wheels 26 of the vehicle 10. While three mowing units 22 are provided in the drawing, two would be sufficient, of which one is located centrally on the vehicle 10 and the other is located to the side of the vehicle 10, or both of which are located to the side of the vehicle 10, or deposit the crop towards the side.

In addition to the pick-up 16 and the first conveyor 18, the windrow merging implement 14 includes a connecting or hitch structure 28 and a carrier 30.

The windrow merging implement 14 is configured in such a way that it can be fastened to the rear region of the vehicle 10, particularly on its rear end, which has the advantage that the crop can be conveyed to the side without any obstruction. The embodiment shown includes a windrow merging implement 14 that is provided with a single pick-up 16 and first and second conveyors 18 and 20, respectively. However this is shown only as an example; rather a windrow merging implement with two pick-ups 16 and several conveyors 18 and 20 or several windrow merging implements 14 could be provided. In general, the windrow merging implement 14 is required to take up crop that has been deposited on the ground by a mowing unit 22 and, if necessary, processed, and to convey it to the side to form swaths or windrows lying close alongside each other or swaths lying upon each other, so that a following pick-up, for example, on a forage harvester or a baler, can take up relatively large quantities of crop, if necessary, with a relatively narrow configuration. In this way, crop deposited on the ground by a side mowing unit 22 can be taken up and deposited either on or alongside the central swath or the opposite swath or deposited between these. These various swath arrangements are made possible by using the various merging implement arrangements shown in FIGS. 1 and 3 through 6.

In the embodiment shown, the windrow merging implement 14 is releasably attached by means of the connecting or hitch structure 28 directly to the chassis 50 of the vehicle 10 in a flange attachment. The connection could also be made The pick-up 16 is configured in a form with tines circulating vertically. A pick-up belt arrangement or the like would also be possible. Crop is picked up at the front of the pick-up 16, as seen in the forward operating direction, and discharged through an opening located in the rear. The pick-up 16 includes a transverse pick-up frame 32 supported at its opposite ends by caster wheels 34. The carrier 30 is in the form of a transverse beam or arm that is attached at a transverse center location of the pick-up frame 32 by a bearing 36 configured as a pendulous bearing which contains a fore-and-aft extending, horizontal bearing axis, through which the pick-up frame 32, and, hence, the pick-up 16 is connected to the carrier 30 so as to pivot vertically. In the preferred embodiment, the pick-up 16 is driven hydraulically by means, not shown.

The first conveyor 18 is connected to the frame 32 in such a way that its conveying surface extends horizontally or inclines slightly in the region of and underneath the path taken by crop discharged through the discharge opening of the pick-up 16. A conveying surface can be formed by various components, for example, a conveyor belt, rolls, a drag chain, a bar chain, the surface of a chute or even by a screw conveyor. The essential requirement is the conveying. The conveyor 18 may be provided at its rear with a wall 38 extending vertically that prevents the crop delivered by the pick-up 16 from falling off the conveying surface. In the preferred embodiment, the conveyor 18 is driven hydraulically by means, not shown, preferably with a control arrangement, that makes it possible to operate in two directions. If necessary, the speed of the conveyor 18 and therewith its ejection distance may also be variable.

The further conveyor 20 that may be present is configured generally in the same way as the first conveyor 18 and is located in end-to-end relationship with the conveyor 18 so that its conveying surface follows that of the first conveyor 18 and can receive the crop coming from the upstream direction. The further conveyor 20 operates in the same direction and/or transports in the same direction as the first conveyor 18 and is preferably driven in the same way. The further conveyor 20 is fastened to the connecting or hitch structure 28. The connection here may be rigid or may be movable, with such movement making it possible to utilize the further conveying by the further conveyor 20 or not to utilize it. If necessary the further conveyor 20 can be folded to the side or upward or downward, if it is not to be used. However, no repositioning arrangement is shown. The further conveyor 20 is located generally behind the vehicle 10.

According to the preferred embodiment, the connecting or hitch structure 28 is provided with a vertical, transverse plate 40, that is provided with several holes through which screws can be inserted for a connection to the running gear of the vehicle 10. At right and left rear side locations of the plate 40 there is a large and a small joint fork 42 and 44, respectively, each of which has a horizontal bearing axis.

The carrier 30 is generally configured as a tube with two legs, and is connected with one end to the large joint fork 42 and with the other end to the frame 32 in the bearing 36 so as to pivot vertically. The geometry of the carrier 30 is selected in such a way that the pick-up 16 can be inserted into the corner region bordered by the legs, when the carrier 30 is pivoted vertically upward. Near the lower end, which connects to the large joint fork 42, the carrier 30 is provided with a connection 46, that may be formed by two brackets or the like and is also provided with a horizontal bearing axis. All bearing axes extend parallel to each other and in the direction of operation. Between the connection 46 and the small joint fork 44, a positioning arrangement 48 extends that is configured in the preferred embodiment as a double-acting hydraulic cylinder that can perform a vertical positioning movement of the carrier 30 about the fore-and-aft extending pivot axis defined by the pivotal connection of the carrier 30 at the large joint fork 42. In place of the hydraulic cylinder 48, a different hydraulic motor, a rope pull, a lever or the like could also be used. The joint forks 42, 44, the carrier 30 and the frame 32 are arranged in such a way that the front edge of the pick-up 16 is always located behind the rear edge of the running gear and hence can be pivoted past its rear end. As shown in FIG. 4, the windrow merging implement 14 is located in a non-operating position behind the chassis 50 of the vehicle 10.

In a modified embodiment, the carrier 30 could also engage underneath the pick-up 16 and the conveyor 18 and thereby place these two components to the right as well as the left of the chassis 50 shown.

Figure 2:
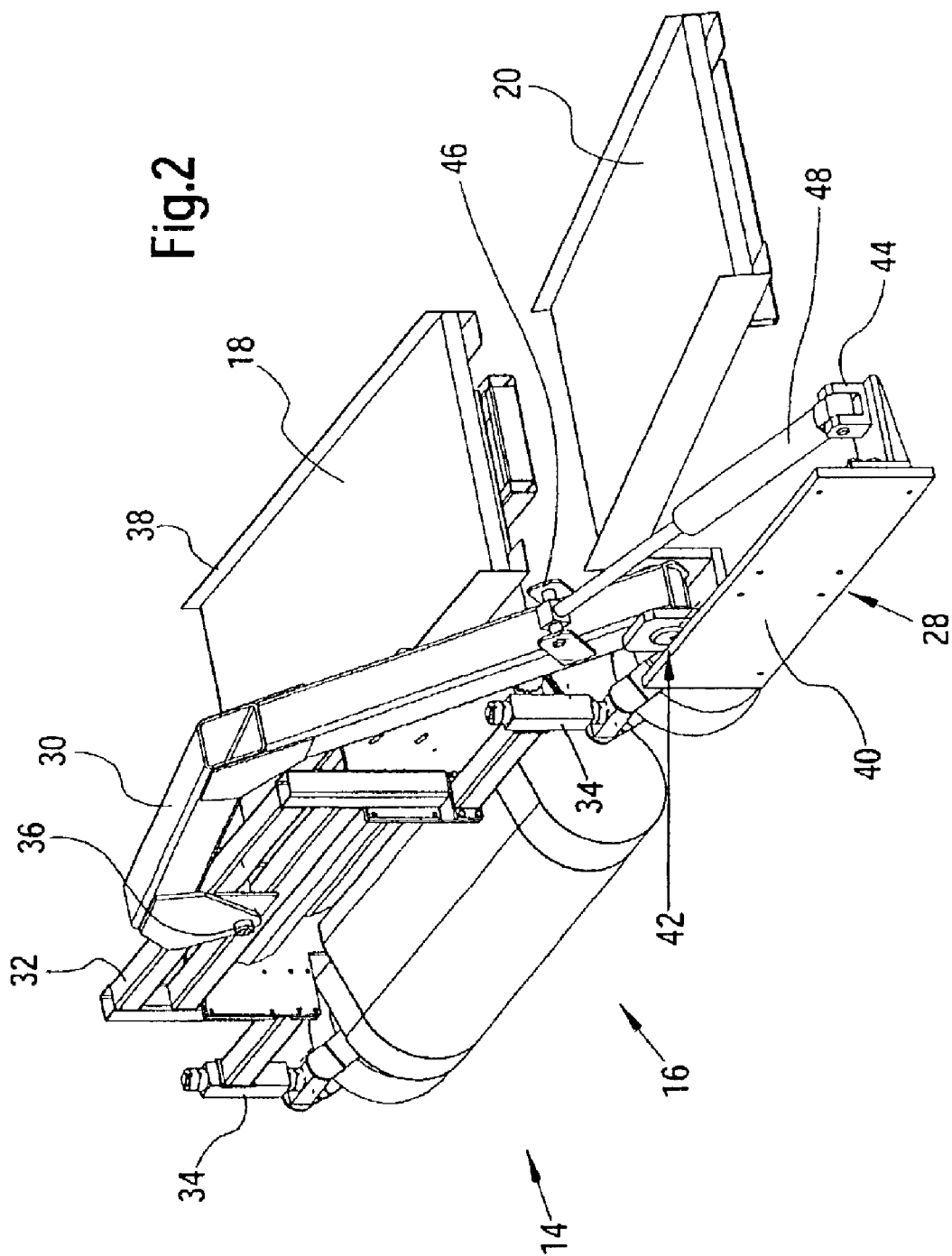
FIG. 2 shows a perspective front view of the windrow merging implement.

As can be seen from FIG. 2, the pick-up 16 can be brought with the first conveyor 18 to a position shown to the side of the connecting or hitch structure 28 and on, or immediately above, the ground, in which both are located above the connecting or hitch structure 30 and, if necessary, above the further conveyor 20.

The following will refer to the configurations shown in FIGS. 3 through 6, in which various embodiments or arrangements of the windrow merging implement 14 are shown.

FIG. 3 shows a windrow merging implement 14 with a pick-up 16 and a first conveyor 18, both of which are located to the right of the running gear and thereby convey the crop taken up on the right side behind the vehicle 10 to its center.

FIG. 4 shows a windrow merging implement 14 behind the running gear, that takes up the crop between the wheels 26 and conveys it to the left or to the right.

FIG. 5 represents a mirror-image arrangement of FIG. 3, but with the second conveyor 20, so that crop is taken up on the left side and conveyed to the center.

According to FIG. 6, two of the pick-ups 16 are provided on opposite sides of the vehicle 10 such that crop is taken up on both sides of the running gear and in each case conveyed behind the running gear to the center where it is deposited on a possible center swath.

These arrangements represent alternatives to the arrangement shown in FIG. 1, in which the crop taken up on the right side of the running gear is transported to a position to the left of it.

All of these arrangements permit a process of harvesting and merging or grouping windrows or swaths of cereal or other crop that is characterized by the following process steps:

a) the crop is cut by the mowing arrangement 12 provided on the vehicle 10 and having at least two discharge openings 24, b) the crop is deposited on the ground by the mowing arrangement 12, and c) the crop is taken up by the windrow merging implement 14 downstream of the location of the deposit and is conveyed to the side, alongside or onto a further swath.

Having described the preferred embodiment, it will become apparent that various modifications can be made without departing from the scope of the invention as defined in the accompanying claims.

What is claimed is:

1. In a windrow merging implement equipped with a pick-up, a conveyor arrangement and a connecting structure for connecting the merging implement to a mowing vehicle, comprising: said implement including a frame joined to said pick-up; a transversely extending carrier interposed between said frame and said connecting structure and being mounted for moving relative to said frame and to said connecting structure; a powered control device being coupled between said carrier and said connecting structure for selectively effecting movement of said carrier; and said connecting structure being adapted for connection with said vehicle approximately in a vertical transverse plane contacting a front side of said pick-up.

2. The windrow merging implement defined in claim 1, wherein said conveyor structure includes a first conveyor mounted in a spatially fixed relationship relative to said pick-up.

3. The windrow merging implement defined in claim 2, wherein said conveyor structure includes a further conveyor that is connected only to said connecting structure.

4. The windrow merging implement defined in claim 2, wherein said pick-up frame includes support wheels coupled to opposite sides thereof.

5. In a combination of a windrow merging implement and a vehicle carrying a mowing arrangement, with said implement being equipped with a pick-up, a conveyor structure for receiving crop discharged from the pick-up and a connecting structure mounting said implement to a chassis of said vehicle, the improvement comprising: said pick-up being located ahead of said conveyor structure and including a frame; a carrier connecting said connecting structure to said frame and; said connecting structure being releasably mounted to a rear end of said chassis approximately within a vertical transverse plane contacting a forward side of said pick-up.

6. The combination defined in claim 5 wherein said mowing arrangement includes at least one discharge opening located to one side of said vehicle for creating a windrow of cut crop; and said windrow merging implement being located such that said pick-up is disposed for picking up said windrow of cut crop; and said conveyor structure being disposed for transporting said windrow of cut crop transverse to the direction of forward travel of said vehicle to a location at least as far as directly behind said vehicle.

7. The combination as defined in claim 5 and further including a second windrow merging implement of a construction, like said first-mentioned implement;

said mowing arrangement including at least two discharge openings respectively located for depositing cut crop in right and left windrows located at opposite sides of said vehicle;

said first-mentioned and second windrow merging implements being transversely aligned with each other, with their respective pick-ups being located for picking up said right and left windrows and with their respective conveyor structures being disposed for depositing crop behind said vehicle.

8. A process for the harvesting and merging of an agricultural crop with a mowing vehicle combined with a windrow merging implement arrangement, comprising the steps of:

a) cutting said crop with said mowing arrangement;

b) discharging the cut crop so as to form first and second transversely spaced windrows;

c) picking up said first windrow; and d) conveying said first windrow transversely to a location, which is one of upon or alongside said second windrow.

9. The process as defined in claim 8, and further including the steps of:

(e) forming a third windrow concurrently with the formation of, and located at an opposite side of, said second windrow from said first windrow; and (f) picking up said third windrow concurrently with picking up said first windrow; and g) conveying said third windrow transversely concurrently with the conveying of said first windrow to a location which is one of upon or alongside said second windrow.

* * * * *